United States Patent [19]
Kingsley et al.

[11] Patent Number: 5,406,379
[45] Date of Patent: Apr. 11, 1995

[54] METHOD OF HYBRID HALFTONE PRINTING BY LIMITING THE NUMBER OF GRAY PIXELS AND GRAY PIXEL LEVELS

[75] Inventors: Jeffrey D. Kingsley, Williamson; Robert P. Loce; Susan E. Dunn, both of Rochester; William L. Lama, Fairport, all of N.Y.

[73] Assignee: Xerox Corporation, Stamford, Conn.

[21] Appl. No.: 980,030

[22] Filed: Nov. 23, 1992

[51] Int. Cl.⁶ .......................... H04N 1/21; G01D 9/42
[52] U.S. Cl. .................................... 358/298; 346/108; 347/240
[58] Field of Search ................ 346/108, 160; 358/455, 358/456, 457, 458, 461, 463, 298

[56] References Cited

U.S. PATENT DOCUMENTS

| | | | |
|---|---|---|---|
| 4,868,587 | 9/1989 | Loce et al. | 346/157 |
| 4,963,900 | 10/1990 | Henderson et al. | 358/298 |
| 5,276,535 | 1/1994 | Levien | 358/456 |

Primary Examiner—Benjamin R. Fuller
Assistant Examiner—Randy W. Gibson
Attorney, Agent, or Firm—Oliff & Berridge

[57] ABSTRACT

A hybrid halftone cell selection method enables selection of gray levels in halftone printing algorithms to minimize the effects of noise resulting in nonuniformities, such as, for example, halftone banding. The method requires selection of hybrid halftone cells possessing structures wherein the total number of gray pixels are limited. The number of gray pixels having any given intermediate reflectance level in any halftone cell is also limited. The cell selection method thus reduces the number of TRC gray steps to some minimum required number by eliminating the most noise sensitive cells (i.e. those cells having the highest percentage of gray level pixels). The intermediate reflectance values of the gray pixels in the selected cells are then selected to produce uniform gray steps and reduce variability in the TRC.

15 Claims, 11 Drawing Sheets

$\Delta L_j = L_{j+1} - L_j$

METHOD OF HYBRID HALFTONE PRINTING BY LIMITING THE NUMBER OF GRAY PIXELS AND GRAY PIXEL LEVELS

FIELD OF THE INVENTION

The present invention relates to hybrid halftone printing techniques, and more particularly to a hybrid halftone printing method for improving print quality by reducing the sensitivity of the hybrid halftoning process to nonuniformities, which can cause, for example, periodic banding, by implementing halftone cell selection criteria and pixel gray level selection criteria to select cell gray levels and minimize the effects of noise.

BACKGROUND OF THE INVENTION

Conventional xerographic copiers do not render faithful or pleasing copies of continuous tone originals. The usual discharge characteristics of the photoconductor and solid area developability of the xerographic development system combine to yield a Tone Reproduction Curve (TRC) with a steep slope and a narrow range. An ideal TRC is a 45° line. The result of the nonideal Xerographic TRC is a copy having washed out highlights and overdeveloped shadows. In order to produce a more faithful and pleasing copy, halftoning algorithms have been developed to yield a TRC with a lower slope and extended range of input gray scale that produces a corresponding change in the output.

In halftoning processes employed by xerographic based digital printers, the image is formed of a texture pattern of black and white spots that gives the impression of gray when viewed at normal reading distance. If the halftone frequency and number of distinguishable half-tone steps are both sufficiently high, the printed picture will be pleasing to the eye. Halftone methods employed in xerographic printers have traditionally been binary, that is, the laser writes with only two laser intensity levels: on and off.

When assessing the quality of a binary xerographic printer, there are two key measures: the halftone frequency (i.e., the number of halftone cells per linear inch), and the number of distinguishable gray steps. To produce a copy of a picture with a minimally acceptable degree of halftone screen visibility requires at least 65 halftone cells per inch measured along a diagonal of the page (assuming a 45 degree halftone screen). Good quality halftones require about 100 cells/inch, while high quality magazines typically use 150 cells/inch or higher.

The number of distinct gray steps needed in the pictorial copy depends on the eye's ability to distinguish closely spaced grays. It has been found that the human eye, at normal reading distance, can detect a reflectance modulation of about 0.5% at spatial frequencies near 1 cy/mm. The inverse of this just perceptible modulation has been interpreted as the maximum number of gray steps that the eye can perceive. A rule of thumb in the printing industry is that an acceptable picture should contain about 65 gray steps. For good quality, 100 or more steps are desired. However, in a binary printer, the maximum number of output gray steps is limited to the number of pixels per halftone cell (p), plus 1. Thus, for a typical 8×4 rectangular halftone cell, p+1=33 output gray steps. High halftone frequencies have fewer pixels per cell and therefore produce fewer gray steps. This is a fundamental limitation of digital binary printers.

Hybrid halftoning is a pictorial printing technique employing a halftone cell structure similar to conventional binary halftoning, but with the added degree of freedom afforded by the use of multilevel gray pixels. U.S. Pat. No. 4,868,587, entitled "Image Halftoning System for Printers", to Loce et al., the disclosure of which is incorporated by reference herein, discloses a hybrid halftoning system. U.S. Pat. No. 4,868,587 discloses the use of a multilevel laser to expose pixels at more than two levels of exposure (i.e. more than just on and off). Alternatively, different colored toners can be used to produce black and gray pixels, respectively, which are combined to form the output image. The resulting multilevel charge pattern is then developed to produce a high quality pictorial print. Using multilevel pixels as opposed to binary pixels results in a substantially greater number of unique halftone cells. When properly selected the average reflectance of these cells can be arrayed nearly uniformly along a perceived lightness scale. To obtain these optimal cells, specific gray pixel levels are used. With specific gray pixel levels, hybrid halftoning can yield significantly improved pictorial reproduction, when compared to binary halftoning, at greatly reduced resolution and data rates. FIG. 1 illustrate that similar tone reproduction quality is obtained with a 1350 spots per inch (spi) binary halftone scheme (FIG. 1) as is obtained using a 300 spi, four level hybrid halftone (FIG. 1) employing all 165 possible cells. Both cases have the same halftone screen frequency (i.e., cell size), and the tone reproduction curves have about the same number of steps. As is apparent, the resolution and data rate advantages of the hybrid approach are significant in this idealized case.

The hybrid halftone system described above is idealized in the sense that it is assumed that the xerographic printer is capable of creating the specific gray pixel reflectance values and that xerographic noise is low enough such that areas of predominantly gray pixels may be formed. However, in most xerographic systems, large gray areas tend to show objectionable artifacts due to nonuniformities of the xerographic process. For example, periodic banding due to photoconductor velocity variations or raster output scanner (ROS) polygon wobble is a common and serious problem in xerographic laser printers.

SUMMARY OF THE INVENTION

It is therefore an object of the present invention to reduce the sensitivity of the hybrid halftone printing process to nonuniformities, thereby reducing, for example, halftone banding.

Another object of the invention is to optimize pixel reflectance values for the newly defined halftone cell scheme once sensitive hybrid cells are eliminated.

Yet another object of the present invention is to provide increased quality tone reproduction compared to binary systems with decreased sensitivity to noise compared to the previous methods.

The present invention reduces the sensitivity of the hybrid halftone process to nonuniformities, such as, for example, halftone banding, by implementing certain cell selection criteria. Furthermore, since it has been found that the pixel reflectance values derived earlier are not the optimum set when sensitive hybrid cells are eliminated, new optimum pixel reflectance values are derived and used to form a high quality print robust against Xerographic process noise.

In order to realize this, and other objects, and to overcome the shortcomings set forth above, a hybrid halftone printing scheme suitable for use with any hybrid halftone printing system comprises the steps of: scanning an image to generate image signals representative of the density of successively viewed elemental areas within the image; selecting hybrid halftone output image signals corresponding to a set of marking cells stored in a memory, wherein each marking cell is a two-dimensional array of pixels, where the pixels in the marking cell may be at a white level pixel, a black level or at least one possible gray level and, the total number of gray pixels must be no greater than a first predetermined maximum, and the number of pixels having identical gray levels is no greater than a second predetermined maximum.

To further reduce unwanted artifacts, such as banding, created by raster spacing nonuniformities, the method comprises the additional step of: limiting the total number of marking cells in the set by eliminating a predetermined number of marking cells having the greatest sensitivity to noise. The remaining marking cells use selected gray pixel reflectances based on an RMS criterion. In addition, in order to reduce tone reversal errors created by the marking process variations, a step of further determining gray levels to minimize the tendency of the marking cells to produce tone reversals can be implemented.

This method provides the advantages of hybrid halftoning while reducing the sensitivity of the hybrid halftone process to objectionable artifacts such as halftone banding due to raster spacing nonuniformities.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENT

While this invention is described in some detail herein, with specific reference to an illustrated embodiment, it is to be understood that there is no intent to be limited to that embodiment. On the contrary, the aim is to cover all modifications, alternatives and equivalents falling within the spirit and scope of the invention as defined by the claims. For example, the present invention is applicable to any number of intermediate gray levels and other halftone cell configurations as well as to the preferred embodiment described below for a hybrid halftone printing method using four gray levels. Furthermore, the present invention is not limited to printing devices. Any image rendering device that performs halftoning may employ the described hybrid halftoning method, such as, for example, a CRT display device.

Figure 10:
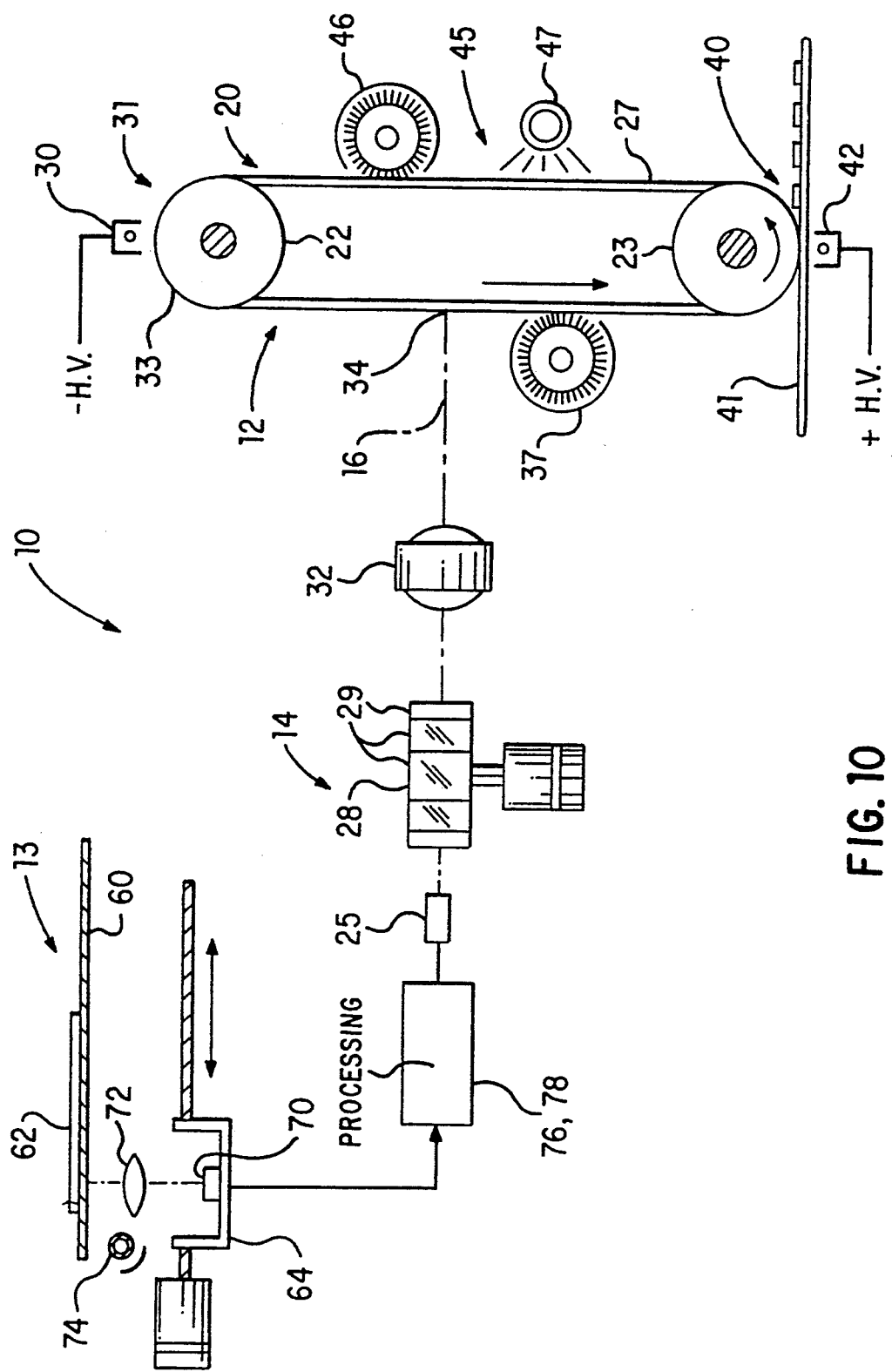
FIG. 10 is a schematic view of a printer incorporating the quaternary system of the present invention for halftone printing.
Figure 11:
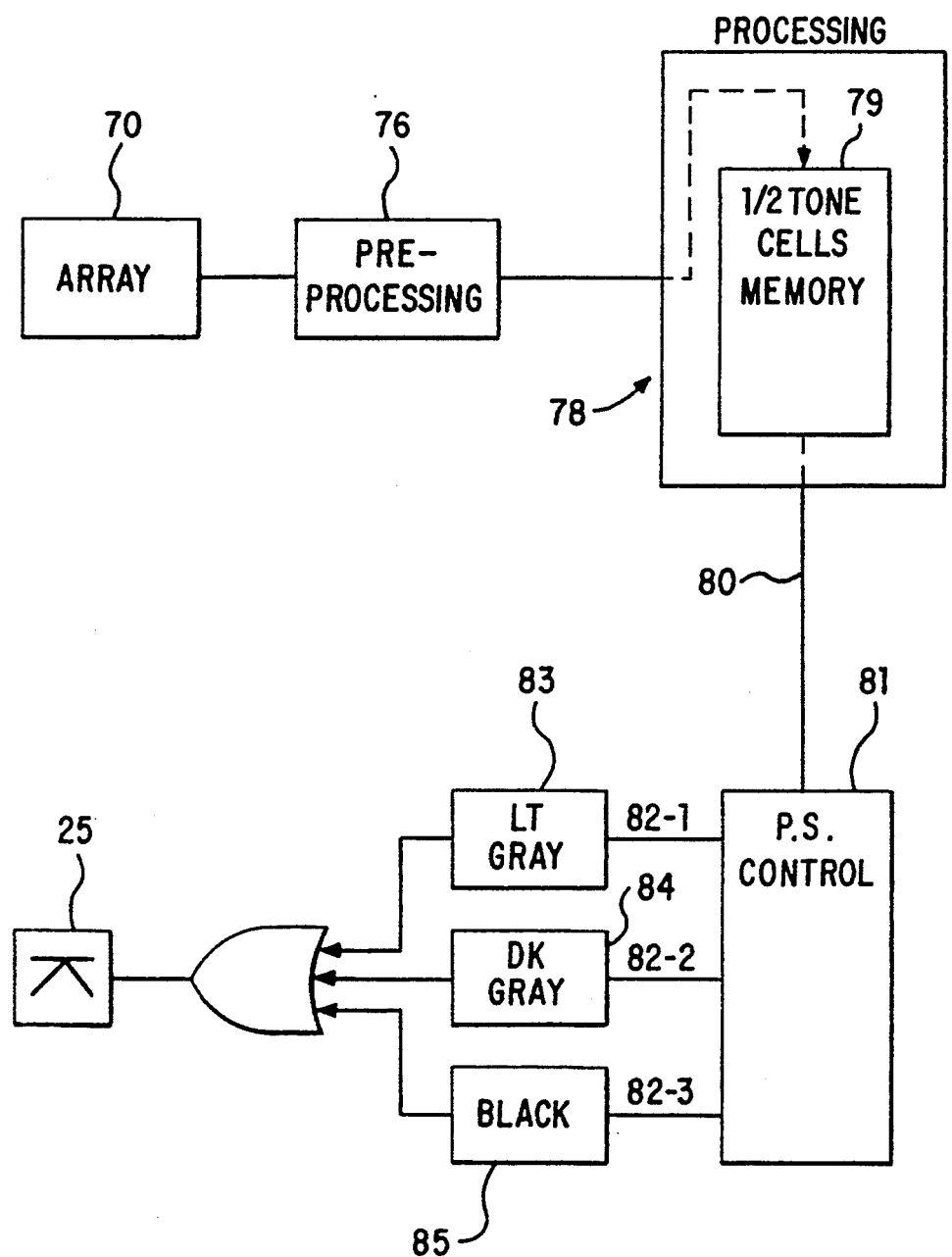
FIG. 11 is a block diagram illustrating the image processing and halftone generating components used with printers shown in FIG. 10.

Referring particular to FIGS. 10 and 11 of the drawings, there is shown an exemplary electronic printer 10 incorporating the quaternary halftone system of the present invention. Printer 10 includes a xerographic processing section 12, a document scanning section 13, and an image printing section 14, the latter including a variable intensity or variable pulse width imaging beam of light 16 for scanning across photoreceptor 20 of xerographic section 12 to provide four level exposure of printing as will appear herein.

Xerographic processing section 12 includes a photoreceptor 20 illustrated herein in the form of an endless belt stretched across drive and idler belt support rollers 22, 23 respectively on which latent electrostatic images representative of the image signal input are created. Belt supporting rollers 22, 23 are rotatably mounted in predetermined fixed position by suitable means (not shown). Roller 23 is driven from a suitable drive motor (not shown) to move photoreceptor 20 in the direction shown by the solid line arrow. While photoreceptor 20 is illustrated in the form of an endless belt, other photoreceptor configurations such as a drum may be envisioned.

Photoreceptor 20 comprises an inner layer or substrate of a suitable flexible electrically conductive substrate with an outer photoconductive layer 27 such as selenium thereupon. Photoreceptor 20 may be opaque, that is, impervious to light or wholly or partially transparent. The exemplary photoreceptor 20 typically has an aluminum substrate that renders the photoreceptor opaque. However, other substrate materials such as glass, may be contemplated which would render photoreceptor 20 wholly or partially transparent. Photoreceptor materials other than selenium as, for example, organic, may also be contemplated. One organic type material, for example, consists of an aluminized Mylar substrate having a layer of selenium dispersed in poly-N-vinyl carbazole with a transparent polymer overcoating containing a charge transport compound such as pyrene.

A corona charging device 30 commonly known as a corotron is operatively disposed adjacent photoreceptor 20 at charging station 31. Corotron 30 which is coupled to a suitable negative high voltage source (−Hv) serves to place a uniform negative charge on photoreceptor 20 in preparation for imaging.

Imaging beam 16 of image printing section 14 is incident on photoreceptor 20 at exposure point 34. Imaging beam 16 is derived from an individual self modulated I.R. diode laser 25, the intensity of beam 16 being at one of three possible levels in the quaternary system described. Beam 16 is swept across photoreceptor 20 by a rotating polygon 28. A suitable lens 32 focuses beam 16 onto photoreceptor 20.

A development subsystem 37 exemplified herein by a magnetic brush roll, is disposed in operative contact with photoreceptor 20 downstream of the contact point 34 of imaging beam 16. Development subsystem 37 includes a suitable developer housing (not shown) within which means for loading the developer onto the development subsystem's magnetic brush roll.

The development subsystem preferably comprises a nonscavenging development system using a mono-component developer, the mono-component developer being a relatively small colorant material (referred to as toner). Due to electrostatic forces, the toner is drawn to the latent electrostatic image formed on photoreceptor 20 by imaging beam 16 in proportion to the latent image charge level to develop the image. In the present arrangement, a discharge development system is used wherein, following negative charging of photoreceptor 20 by corotron 30, image areas are discharged by beam 16 in accordance with image signals. The developing toner is negatively charged and is therefore attached to the discharge image areas while being repelled from the nondischarged areas.

As will be understood, in the development subsystem of this type, when the intensity of beam 16 is a maximum, maximum development occurs and a black pixel is obtained. When beam 16 is turned off, no development occurs and a white pixel is obtained. In the quaternary system described, two intermediate gray pixel levels are required. These are obtained by providing two intermediate beam intensity levels so that corresponding intermediate amounts of development take place to provide predetermined light gray and dark gray pixels respectively.

Following development of the latent electrostatic image on a photoreceptor 20 by developing subsystem 37, the developed image is transferred to a suitable copy or print substrate material 41 such as paper at transfer station 40. To facilitate transfer, a transfer corotron 42, which is coupled to a high voltage power source (+Hv), is provided to attach the developed image on photoreceptor 20 to copy substrate material 41. Following transfer, the developed image is fixed by fusing. Any residual charges and/or developing material left on photoreceptor 30 are removed at cleaning station 45 by erase lamp 47 and cleaning brush 46 respectively.

At document scanning section 13 of printer 10, image data in the form of electrical signals representative of the document reflectance are generated. In the exemplary arrangement shown, document scanning section 13 includes a transparent platen 60 on which a document 62 bearing the image to be processed and printed is placed, either manually or by means of an automatic document handler (not shown). A suitable carriage 64, supported for reciprocating back and forth movement below platen 60, has one or more linear scanning arrays, identified as array 70, mounted thereon. Array 70 may comprise any suitable scanning array type as, for example, a CCD. Carriage 64 is driven by a suitable reversible driver such as a step motor (not shown). Suitable optics, exemplified here by lens 7 focuses array 70 on a line of the image on document 62. A suitable lamp 74 illuminates the document line being scanned by array 70.

Array 70 converts each line of the document image viewed into a succession of analog image signals. The image signals are output to a video preprocessing section 76 where the signals are converted from analog to multibit digital image picture elements or pixels representing the document reflectance levels. Preprocessing section 76 and a processing section 78 store and operate on a number of lines of image signals at once. Preprocessing section 76 averages the pixels on a block by block basis to find an average cell reflectance value, the size of the block processing being equal to the size of the halftone cell. For example, where 2×4 halftone cells are used to process the image signal, each block of pixels processed by preprocessing section 76 would be two lines wide and four pixels long. The average cell reflectance values determined by preprocessing section 76 are output to processing section 78.

Processing section 78 includes a memory 79 for storing an array of discrete halftone cells for use in processing the image signals. The average cell reflectance values output by preprocessing section 76, which are in the form of the multibit digital image signals, are input to processing section 78. There, the average cell reflectance values, along with the pixel reflectance values, are used in a look-up table to select the appropriate halftone cells to be printed. Since processing is done on a block by block basis, the halftone cells for output are held, for example, in a suitable buffer, at least until processing of the line of pixels is complete.

In the quaternary system described, each halftone cell is made up of various combinations of pixels having one of four possible reflectance levels. Processing section 78 outputs to line 80, on a pixel by pixel, line by line basis, multibit control signals representative of the halftone cells to be printed to power supply control 81. Control 81 responds to the control signal inputs by providing power actuating signals on lines 81-1, 82-2, 82-3 that selectively actuate power supplies 83, 84, 85 respectively.

It is understood that where it is desired to preserve image microstructure, pixels within the halftone cells can be rearranged during processing so as to best correspond to the positions of the original pixels in the block of pixels being processed. This can be accomplished by matching the individual pixel values in each block with the image pixel values in the halftone cells selected. For example, the white pixel(s) in the halftone cell selected would be relocated in the halftone cell to match the location of the lightest pixel(s) in the block of original pixels, the black pixel(s) relocated to match the location of the blackest pixel(s) in the block, the light gray pixel(s) relocated to match the location of the light gray pixel(s) in the block, and the dark gray pixel(s) relocated to match the location of the dark gray pixel(s) in the block.

Power supplies 83, 84, 85 each provide different levels of power output for driving diode laser 25 to expose photoreceptor 20 and provide a latent electrostatic image in accordance with the image content of the image signal output of array 70. In the quaternary system disclosed, power supply 83 provides a first level power input to laser 25 to cause laser 25 to output a beam 16 at a first intensity level corresponding to light gray. Power supply 84 provides a second level power input to laser 25 to cause laser 25 to output a beam 16 at a second intensity level corresponding to dark gray. And, power supply 85 provides a third level power input to laser 25 to cause laser 25 to output a beam 16 at a third intensity level corresponding to black. It will be understood that exposure at the remaining fourth level, i.e., white, in the quaternary system disclosed herein is accomplished through the absence of a control signal to power supplies 83, 84, 85. In that event, diode 25 does not expose photoreceptor 20 so that the charge remaining on the photoreceptor 20 at the point of development is insufficient to cause developing by developer 37. As will appear, the halftone cells held in memory 79 of processing section 78 are chosen to provide a series of average gray reflectance that give enhanced image reproduction.

While separate power supplies 83, 84, 85 are shown, it will be understood that any suitable source of power for operating diode 25 at the various intensity levels described may be used.

Figure 1:
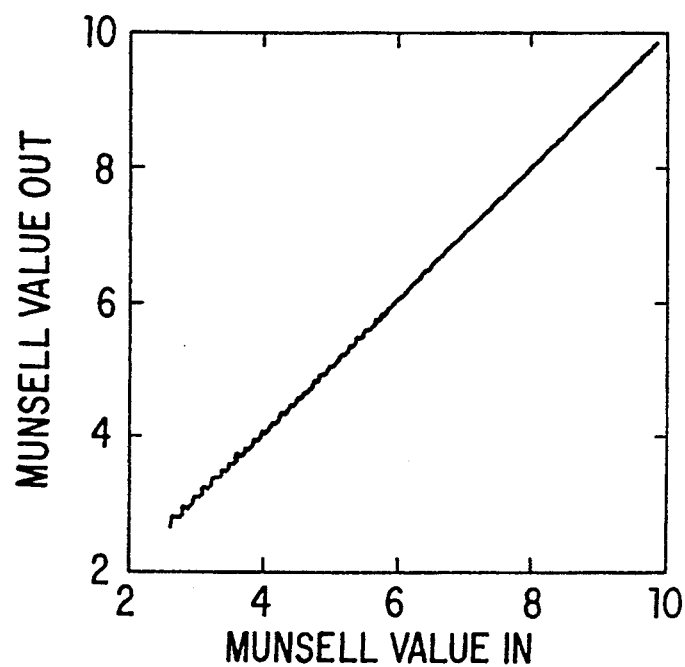
FIG. 1 is a graphical representation of the TRC for a binary (i.e. 2 exposure levels) 1350 spi halftone process.
Figure 2:
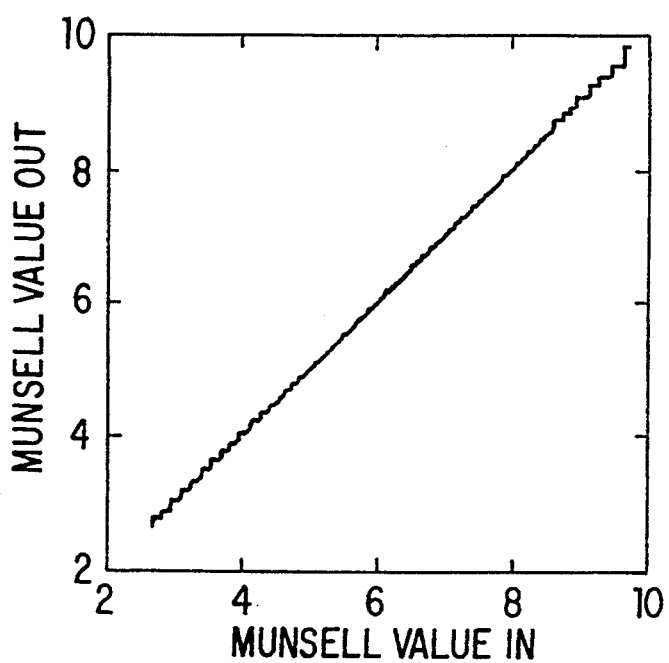
FIG. 2 is a graphical representation of the TRC for the hybrid halftone quaternary (i.e. 4 exposure levels) 300 spi process.

As discussed above, hybrid halftoning is a pictorial printing technique employing a halftone cell structure, similar to conventional binary halftoning but with the advantage that the individual pixels in the hybrid halftone cell may be one of a chosen number of gray levels, in addition to the black and white levels of the conventional binary system. The added degree of freedom afforded by the use of multilevel pixels provides improved tonal quality compared to the binary case. As shown in U.S. Pat. No. 4,868,587, the disclosure of which is incorporated herein by reference, hybrid halftoning can yield significantly better pictorial reproduction compared to binary halftoning, at reduced resolution, and reduced data storage and data transmission requirements. An idealized example is shown in FIG. 1 where similar tonal quality is achieved with a 1350 spi binary scheme (FIG. 1) or with a 300 spi quaternary (four level) hybrid halftone (FIG. 1). However, these advantages come with a considerable challenge, since the degrees of freedom introduced by hybrid halftoning are many and their effects are substantial. For example, in conventional xerographic systems, large gray areas tend to show objectionable artifacts due to nonuniformities of the process. For example, halftone banding due to photoconductor vibrations or ROS polygon wobble is a common and serious problem that is exacerbated when gray pixels are employed. Furthermore, most xerographic systems have difficulty producing precise gray levels, even if only one or two gray levels are needed. This limitation of the xerographic system is one reason why most xerographic printers have operated in the binary mode. Noise and inaccuracy have limited the quality of prints created by the hybrid halftone printing process. The present invention provides a method of hybrid halftone printing employing hybrid halftone cell selection criteria to minimize the effects of nonuniformities in xerographic printing processes.

Figure 3:
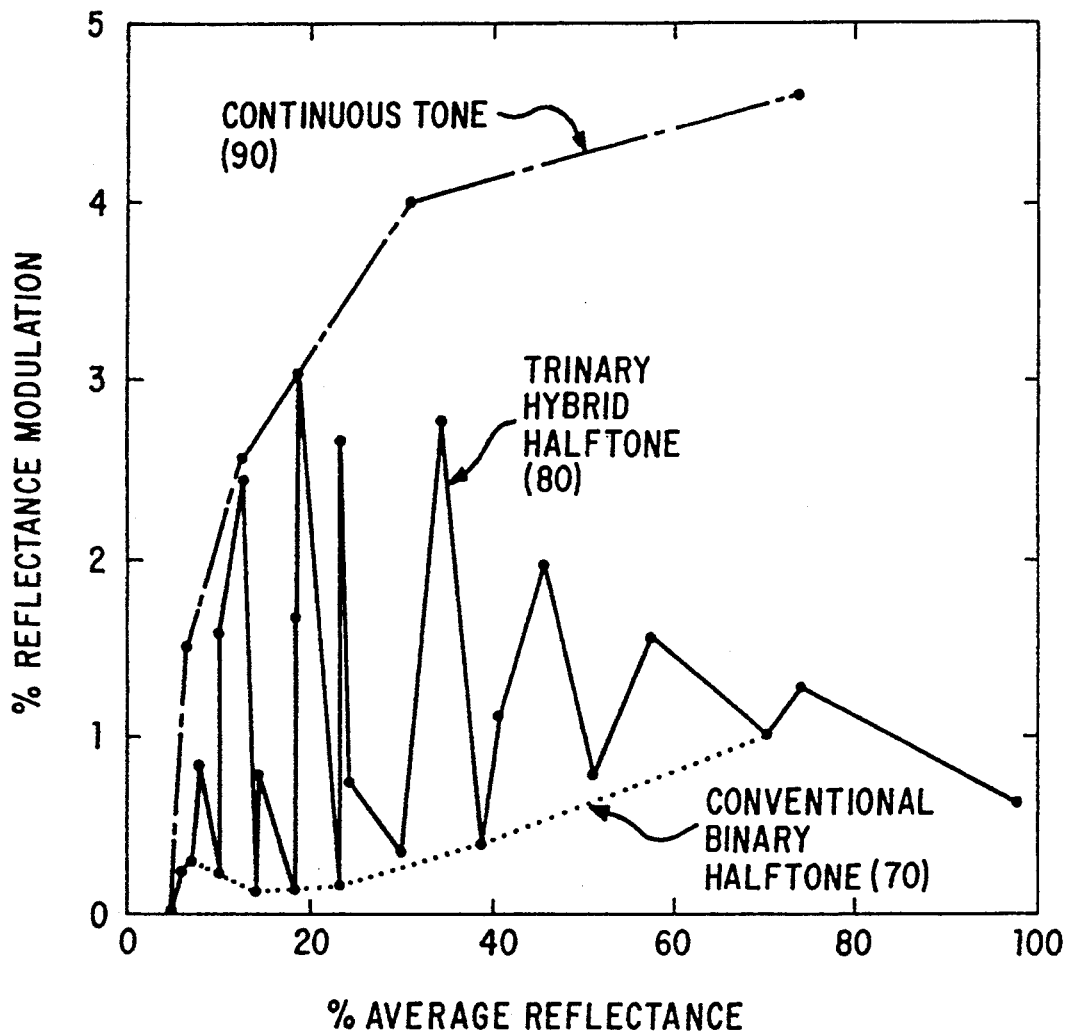
FIG. 3 is a graphical representation of binary halftone, hybrid halftone, and continuous tone reflectance modulation versus average reflectance produced by 1% velocity modulation of the photoreceptor.

FIG. 3 illustrates the banding modulation (denoted as reflectance modulating) produced by 1% photoreceptor velocity modulation for binary halftone, hybrid halftone, and continuous tone cases. It can be seen that the conventional binary halftone has a relatively low amount of reflectance modulation for a given average reflectance, and thus is the image structure least sensitive to noise. The relatively high amount of reflectance modulation of the continuous tone image indicates its high sensitivity to imaging perturbations. This is to be expected since continuous tone printing is equivalent to writing purely gray cells. Hybrid halftone cells, depending on their average reflectance, may consist of purely black and white pixels, all gray pixels, or a combination of black, white and gray pixels. Points on the graph at which the hybrid halftone curve intersect the conventional binary halftone curve correspond to the binary subset of all possible hybrid cells. The points of the hybrid halftone curve that approach the continuous tone curve represent cells containing a high percentage of gray pixels. Other cells having intermediate numbers of gray, black and white pixels lie on the curve between the binary and continuous tone limits. Cases in which the halftone cell has many gray pixels and approaches the continuous tone limit are to be avoided since they are the most sensitive to noise.

Cell selection criteria for hybrid halftone printing systems is dependent upon a variety of factors. These factors include, but are not limited to, the halftone cell structure, the number of gray levels, the number of pixels per halftone cell, and the number of gray steps desired for the quality of reproduction.

As noted earlier, the number of gray steps used in the halftoning process is related to the quality of the reproduced image. Examples of the number of gray steps realized by quaternary (two gray levels) and trinary (one gray level) systems for a given number of pixels per cell as compared to a conventional binary system are shown in Table 1 below.

TABLE 1

Number of Gray Steps for Idealized Trinary and Quaternary Systems Compared With a Binary System

| m × n (cell size) | p (number of pixels) | Binary (2-levels) | Trinary (3-levels) | Quaternary (4-levels) |
|---|---|---|---|---|
| 2 × 4 | 8 | 9 | 45 | 165 |
| 3 × 6 | 18 | 19 | 190 | 1330 |
| 4 × 8 | 32 | 33 | 561 | 6545 |

In both the quaternary and trinary systems, the number of gray steps are related to the halftone cell frequency (cells-per-inch or cpi) and the raster frequency (spots-per-inch or spi). As is apparent from Table 1, the binary system does not fall within the acceptable minimum of 65 gray steps as discussed earlier. Halftone processing with a single intermediate gray level (three exposure levels), the trinary system, provides the necessary gray levels to give an acceptable number of gray steps. Halftone processing with two intermediate levels (four exposure levels), the quaternary system, improves image quality substantially.

Figure 4:
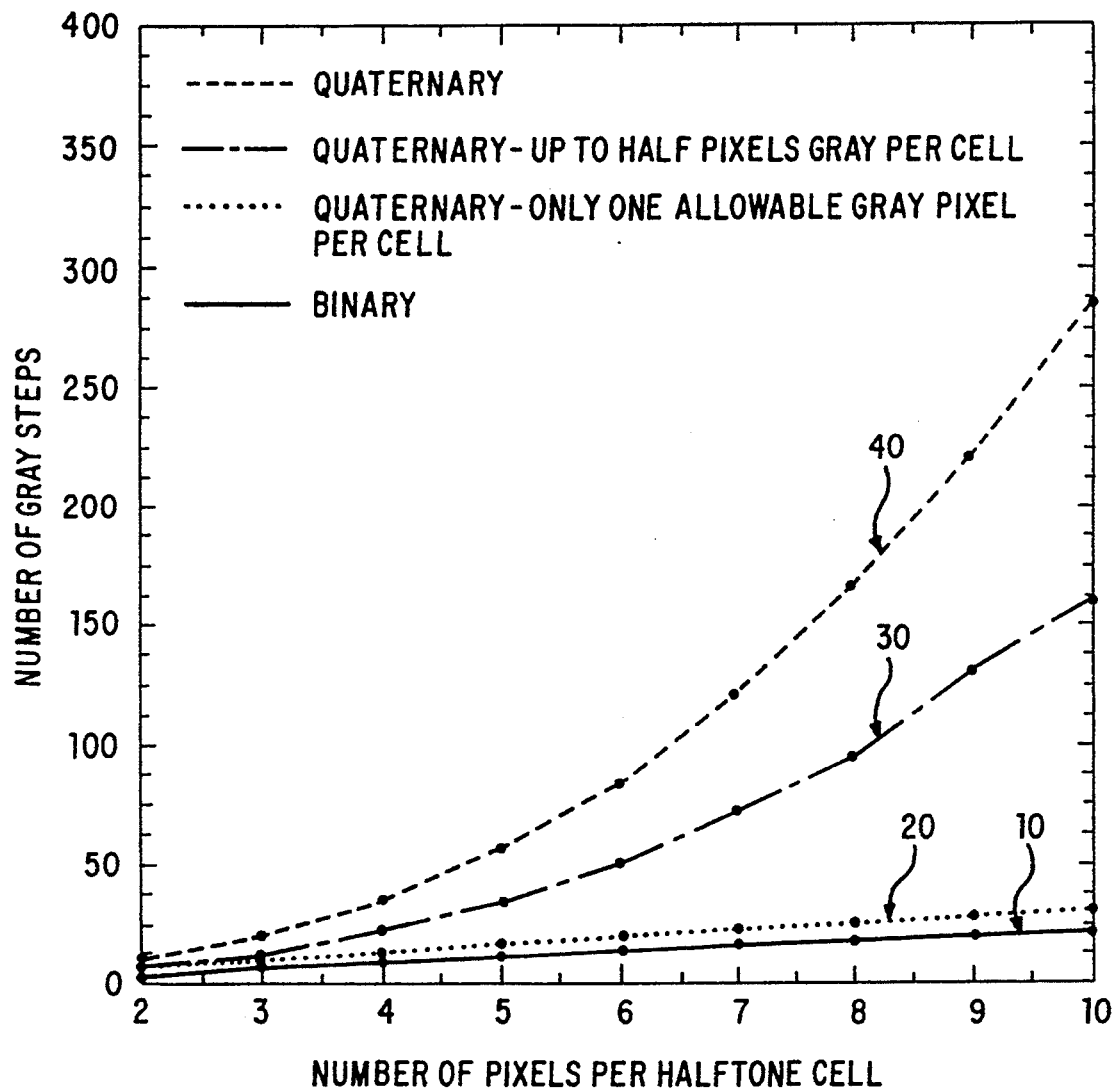
FIG. 4 is a graphical representation showing the number of gray steps possible for a given number of pixels in a halftone cell for various types of halftone cell criteria.

A measure of the pictorial quality of the halftoning process is the deviation of the tone reproduction curve (TRC) for a hybrid halftoning scheme from the ideal TRC, a 45° straight line. Large steps in the TRC curve are manifested by false contours being printed where the original or enhanced image has a continuous gradation of reflectance. A superior TRC is obtained when the step size in the graph is minimized. FIG. 4 shows the theoretical number of halftone gray steps achievable as a function of the number of pixels per halftone cell for quaternary hybrid halftone printing with the fraction of gray pixels per cell variable. With only one gray pixel per cell allowed, denoted by line 20 in FIG. 4, the improvement over binary printing 10 is modest. When full quaternary halftone printing is used, as illustrated by line 40, with no limitation on the number of gray pixels allowed in the halftone cell, the number of gray steps is at a maximum. However, full quaternary printing is quite sensitive to noise as described above with respect to FIG. 3. Line 30 shows the number of gray steps achievable when quaternary halftone printing with the constraint that any particular cell can only have half of its total number of pixels printed with an intermediate gray level. As will be shown below, this cell structure results in an acceptable number of gray steps while having a reduced sensitivity to noise. The primary criteria in selection of these halftone cells, is maximizing the number of TRC gray steps while minimizing the sensitivity of the hybrid halftone printing process to noise. Thus, certain cell selection rules are used to reduce the sensitivity of the hybrid halftone process to nonuniformities, which can cause, for example, halftone banding.

Therefore, when printing with a particular marking process, cell selection rules should be applied to the total set of possible hybrid halftone cells to eliminate those cells that print with the greatest degree of sensitivity. The present invention implements cell selection criteria that (a) limit the size of uniform gray areas; and (b) limit the total amount of gray. These selection criteria are also constrained by the requirement of using a sufficient number of gray steps and pixels so that the quality of the resulting image remains high.

The inventors have found that maintaining the number of gray pixels per halftone cell below a predetermined maximum number limited the total amount of gray in a manner that reduced sensitivity to noise. In addition to limiting the number of gray pixels per halftone cell, minimization of the total size of uniform gray areas was achieved by maintaining the number of gray pixels having the same gray level in each cell below a predetermined maximum number. This constraint limits the number of gray pixels per halftone cell at any one reflectance level. Therefore, by limiting both the number of gray pixels per halftone cell and the number of gray pixels having a single reflectance level within each cell, minimization of the size of uniform gray areas and the total amount of gray is achieved.

In particular, limiting the number of gray pixels per halftone cell to no more than one-half of the total number of pixels in the cell maintained the amount of gray in the image below a level that was susceptible to banding. In other words, in a halftone cell of m by n pixels, the maximum number of gray pixels is preferably no greater than $(mn)/2$. Limiting the number of gray pixels having any one reflectance level to a maximum of three pixels per halftone cell further reduced noise susceptibility. The quality of printing using the set of cells formed in accordance with the cell structure selection criteria of the present invention is significantly better than printing with binary cells and the sensitivity to noise is greatly reduced compared to full quaternary hybrid halftone case, without any perceptible reduction in pictorial print quality.

Figure 5:
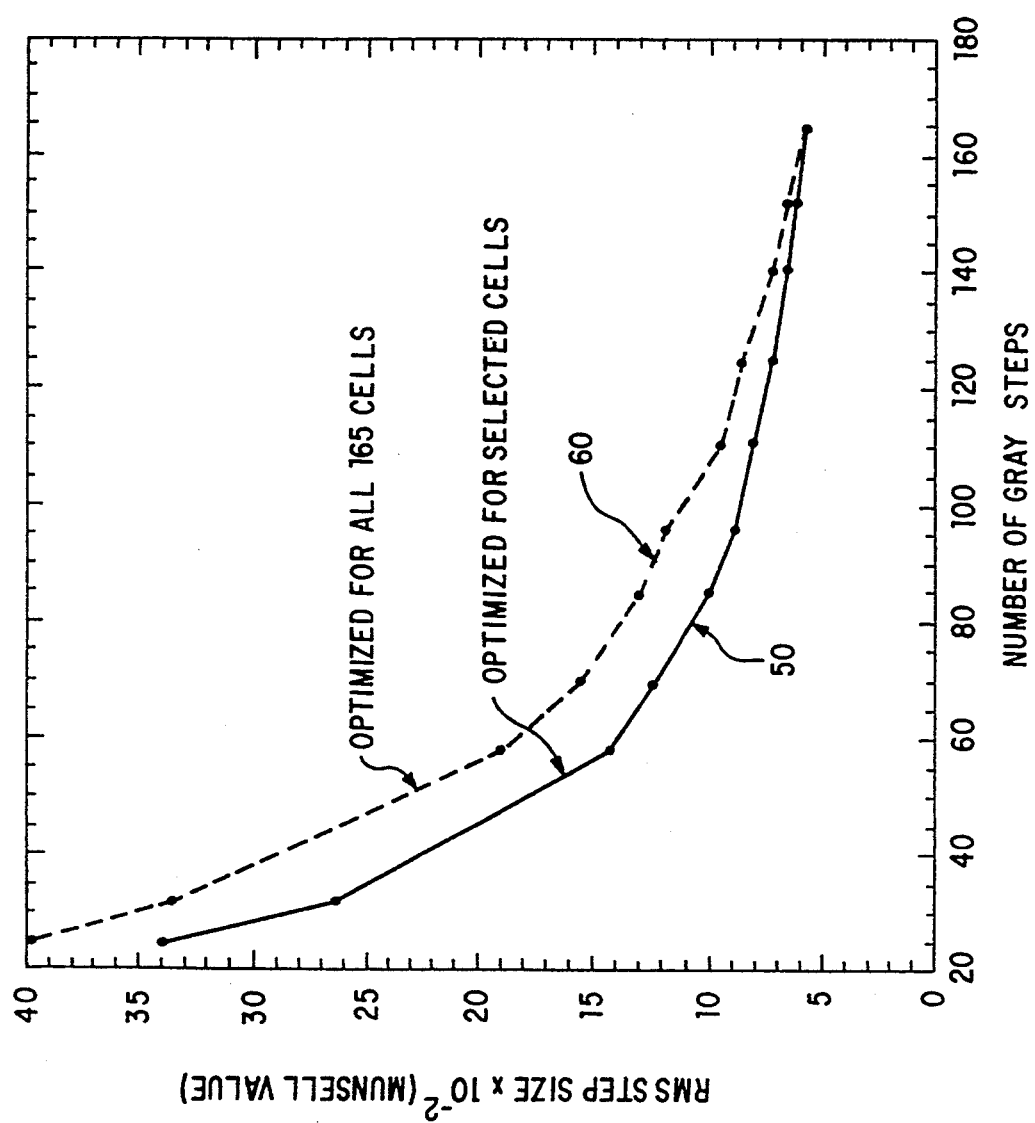
FIG. 5 is a graphical representation of the root-mean-square TRC step size versus number of gray steps for two different approaches to gray pixel level selection for an example using an eight pixel marking cell in the full quaternary case (i.e. having four exposure levels, two of which are gray)

Given the improved cell structure described above, the pictorial quality resulting from the hybrid halftoning process can be quantified by calculating the root-mean-square (RMS) step size in the TRC. FIG. 5 shows the rms step size of the TRC as a function of the number of halftone steps for an 8 pixel halftone cell example that produces 165 steps in the full quaternary case. The varying number of steps are a result of applying different cell selection rules. Line 50 shows the RMS step size versus the number of gray steps in the example where the gray level reflectance values used for printing the gray pixels have been determined using the limited number of selected cells. Line 60 shows the RMS step size where the pixel gray level reflectance levels were selected for the full 165 cell case. The upper curve 60 in FIG. 5 (denoted by the dashed line) is obtained by eliminating cells (which do not meet the cell selection criteria set forth above) while using pixel reflectance values previously determined (i.e., the reflectance values used to reduce RMS step size in full quaternary halftone printing). The figure shows that there is an improvement (reduction of TRC RMS) by determining the pixel reflectance values for the selected set of hybrid cells. The selection of the gray level reflectance values result in halftone images that are less sensitive to noise and have minimum TRC step size.

Further concerning cell selection and TRC step size, rms step size does not increase significantly if the number of halftone cells is reduced to 85. Choosing 85 cells will result in a difference in the rms step size of only 0.05 compared to, for example, the 165 cell RMS step size. Thus, if only 85 cells are to be used, eliminating 80 of the most noise sensitive cells does not significantly increase the RMS step size, and thus significantly increase gray level contouring in the pictorial reproduction. The number of steps eliminated and the RMS step size tolerance that is acceptable is a function of the picture quality desired. In this example, a predetermined RMS step size tolerance of $5 \times 10^{-2}$ was chosen. With reference to the graph shown in FIG. 5, it can be determined that 85 gray steps satisfies this criterion. Sensitivity to noise is generally a function of the percentage of gray pixels in a particular cell. The higher the percentage of gray pixels, the more sensitive the cell is to noise. Therefore, 80 cells having the highest percentage of gray pixels are eliminated. With a high enough halftone screen frequency, such as, for example, 130 cpi (cells per inch), the use of 85 distinct hybrid cells yields a good quality pictorial reproduction. When applying the above-described cell selection and elimination criteria, the RMS step size of the resulting TRC is generally higher since a reduced number of cells is employed. Therefore, in order to reduce RMS step size (to prevent false contouring) the reflectance values of the intermediate gray level pixels should be determined once the cell selection criteria have been implemented to achieve the lowest possible RMS deviation from the TRC.

For periodic halftones, it can be assumed that the observed printed reflectance of a given cell will be the average reflectance $R_{ave}$ of that cell:

$$R_{ave} = \frac{1}{p} \sum_{k=1}^{p} R(k), \quad (1)$$

where p is the number of pixels in the cell and R(k) is the reflectance of the kth pixel averaged over the nominal pixel size. The average reflectance, $R_{ave}$, is one of a set of distinct possible reflectance steps. The set of all $R_{ave}$ is manipulated to form the TRC for a given set of conditions (i.e. number of pixels per cell and the possible gray levels of each pixel). TRC is often plotted as Optical Density Out v. Optical Density In, where density is related to reflectance by:

$$D_{ave} = -\log(R_{ave}) \quad (2)$$

Density is commonly used because the human eye response is approximately linear on a density scale. A more linear measure of lightness response is the Munsell Value, L, which ranges from zero to ten and is approximated by:

$$L_{ave} = 2.468(100\, R_{ave})^{\frac{1}{3}} - 1.636 \quad (3)$$

Since the eye response is linear in Munsell space, equal differences in L will give an equal difference in response throughout the lightness range. The $L_{in}$-$L_{out}$ representation is preferred for plotting digital TRCs because the optimum TRC, defined to be one that minimizes false contouring, becomes a stepped function with equal size steps.

In generating $L_{in}$-$L_{out}$ curves, all possible $L_{ave}$ values for a given set of halftone conditions are calculated. When arranged in increasing order, the cell lightness values represent the possible printed average lightness levels, $L_{out,i+1}$ being brighter than $L_{out,i}$. It is assumed that, from the set of available halftone cells, an input lightness value, $L_{in}$, will be mapped to the closest possible cell average lightness value, $L_{out,i}$. In this way, the $L_{in}$-$L_{out}$ curve becomes a stepped function with an average slope of 45°.

Intermediate pixel reflectance values that minimize step size in the TRC, and therefore minimize false contouring, can be found. To determine the preferred intermediate reflectance level, TRC quality criteria must be established. A simple measure that is inversely proportional to the digital TRC quality is the RMS step size, where N is the number of steps:

$$\text{RMS Step Size} = \left[ \frac{1}{N-1} \sum_{i=1}^{N-1} (L_{i+1} - L_i)^2 \right]^{\frac{1}{2}}. \quad (4)$$

Deviations from uniform spacing result in a greater inclination toward false contouring, and can be seen as an increase in the rms step size. A preferred intermediate reflectance level may be one that results in minimum rms step size. For a given step size, a numerical computer analysis can be used to determine the relationship between rms step size and intermediate pixel reflectance level.

There are other measures of TRC quality that can be used to provide intermediate pixel reflectance levels that give similar results. Two other measures are the largest step size and the sum of the squared steps. Additional metrics can be employed for robustness, such as Tone Reversal Error (TRE), which will be described below.

Figure 7:
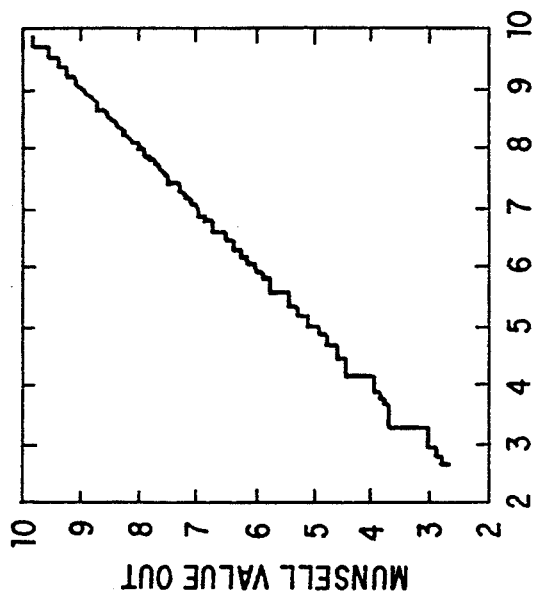
FIG. 7 is a graphical representation of the TRC in which 80 of the most sensitive cells have been eliminated from the full quaternary case (i.e., 85 steps remain) wherein the pixel reflectance values correspond to those from the FIG. 6 example.
Figure 8:
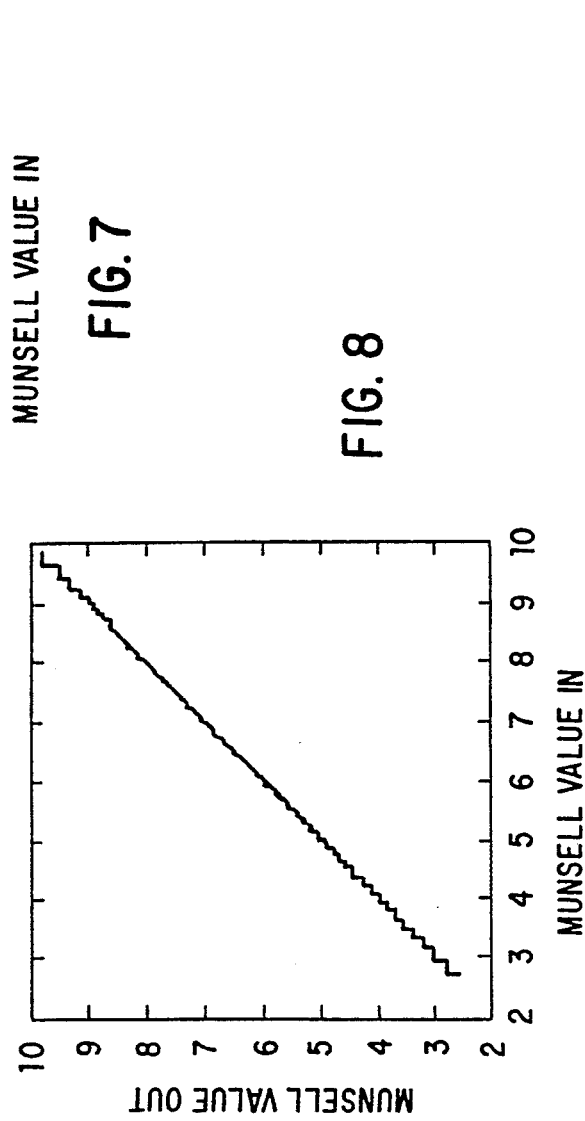
FIG. 8 is a graphical representation of the TRC for the case shown in FIG. 7 after the reflectance values have been determined by changing the gray pixel levels in accordance with the gray level determination criteria for the 85 remaining gray steps.
Figure 6:
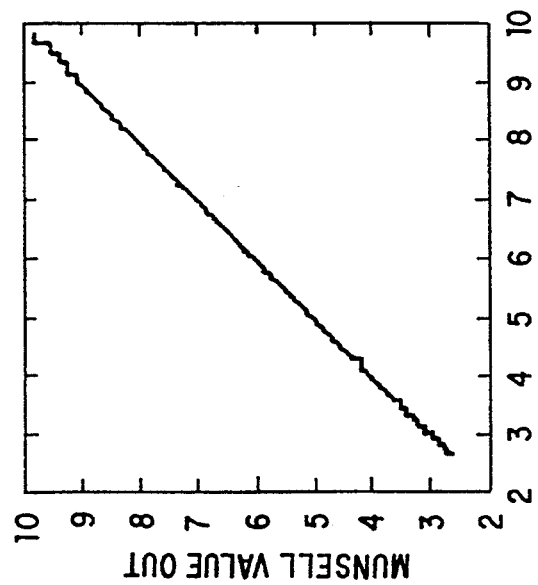
FIG. 6 is a graphical representation of the TRC for the full quaternary example having 165 steps with reflectance levels based upon gray level determination criteria.

An example showing the resulting TRCs for a hybrid halftone printing system using the cell selection criteria of the present invention is shown in FIGS. 6, 7 and 8. FIG. 6 shows the TRC of a hybrid halftone process utilizing two intermediate gray reflectance levels ($R_1$ and $R_2$, a total of four exposure levels) having 165 gray steps, i.e., full quaternary printing. As discussed above, this hybrid halftone will be very sensitive to noise and will show nonuniformities, such as, for example, banding. FIG. 7 illustrates the TRC resulting from use of the cell selection criteria described above and elimination of 80 of the most sensitive cells, resulting in a halftone image having 85 gray steps and a lower sensitivity to noise. The number of steps used is variable and depends upon the quality/sensitivity trade-off selected by any particular user. There is no intent to be limited to the 85 gray step example discussed herein. Note that, the intermediate pixel reflectance values ($R_1$ and $R_2$) in FIG. 7 were determined for the 165 cell condition. Applying the gray level selection techniques described above to determine the reflectance values of the intermediate gray level pixels for the 85 cell condition results in, a TRC having small steps, as shown in FIG. 8. When hybrid halftone processing is performed using the cell selection criteria of the present invention, the resulting pixel gray levels must be determined using the selected cells to realize a high quality halftone image with a reduced sensitivity to noise. The selected reflectance values in the example were $R_1 = 0.32$ and $R_2 = 0.12$. The reflectance values chosen depend upon many variables, including the number of steps used in any particular hybrid halftoning process. Thus, if 100 (instead of 85) steps are used, the determined reflectance values $R_1$ and $R_2$ will change. Another factor in selecting the reflectance values is the type of printer utilized. The RMS step size criterion can be used to determine a family of intermediate reflectance values, all of which can provide improved image quality. If so desired, the selection process can be further improved using a second criterion applied to the reflectance values. This criterion is Tone Reversal Error. The Tone Reversal criteria selects the reflectance based on a statistical weighting of the process variation.

Thus far the selected intermediate pixel reflectance level for a given set of cells is that level which gives the TRC with the absolute smallest RMS step size. To prevent copy quality defects, such as halftone banding, the set of cells selected should not contain certain sensitive cells. Increased robustness against copy quality defects may be obtained by first requiring that the intermediate level provide only a "sufficiently low" RMS step size instead of the absolute minimum. Then all intermediate pixel gray levels that meet this criterion can be evaluated in terms of their susceptibility to a given copy quality defect. In a real system the reflectance level of a pixel is always printed with some degree of uncertainty. Thus, the defect of reversals in the TRC due to printing of the intermediate level at a reflectance other than the nominal cause objectionable contouring. Also note that a "sufficiently low" criterion could be placed on other TRC quality metrics, e.g., largest step, RMS deviation from a line, sum of the squared steps, etc.

In order to select the RMS value that is sufficiently low, the meaning of this metric must be considered. It is a measure of the average step size in a TRC. When the gray steps are uniformly spaced, the RMS step size equals the actual step size. For TRC's which have minimal redundancy, the gray steps are roughly equal. Also, for xerographic prints, the Munsell value ranges approximately from 2.7 (black) to 10.0 (white paper) when normalized to the paper background. Knowing this, copy quality goals of a given product can be used to determine an acceptable RMS step size. For example, a printer may need 64 equally spaced gray steps to satisfy customer requirements. The required step size is thus $(10.0-2.7)/64=0.114$. To achieve an RMS step size much smaller than this may not further satisfy the customer and may result in an intermediate reflectance level that is more prone to vary in a real printing system. For a comparison to conventional halftoning systems, consider three commonly employed screen frequencies and cell sizes: $4\times 8$ (p=32), $5\times 10$ (p=50), $8\times 8$ (p=64), where p is the total number of pixels. The corresponding tone reproduction RMS step sizes for binary printing are 0.259, 0.167 and 0.131, respectively. Note that since we are referring to a binary system the TRC gray steps will not be uniformly spaced.

Each of the intermediate reflectance levels that gives an acceptable RMS step size has the potential to be a selected intermediate level. A criterion that further evaluates these intermediate levels may now be defined. Deviation from the nominal printed reflectance of a gray level pixel can result in tone reversal errors. This can result in a highly objectionable defect. For example, in a gray wedge image that should monotonically vary from light to dark, tone reversal errors would cause random or periodic fluctuations about this trend. Thus, a second criterion for choosing an intermediate reflectance level can be based on the requirement that the set of selected cells have a minimum tendency toward tone reversal. All intermediate levels that have an acceptable RMS value can be judged against this criterion.

Figure 12:
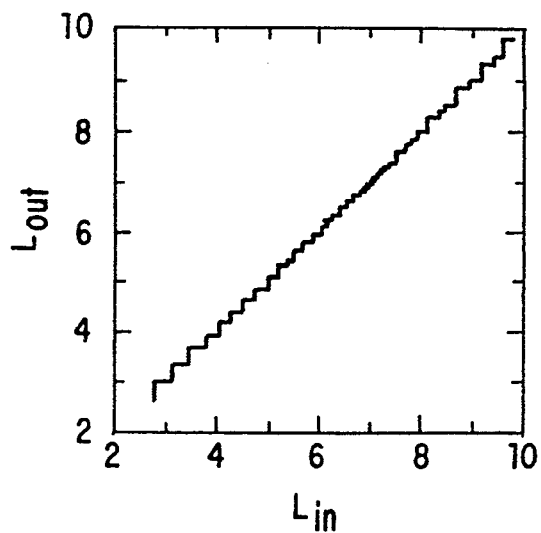
FIG. 12 is a graphical representation of a TRC with no Tone Reversal Errors.
Figure 13:
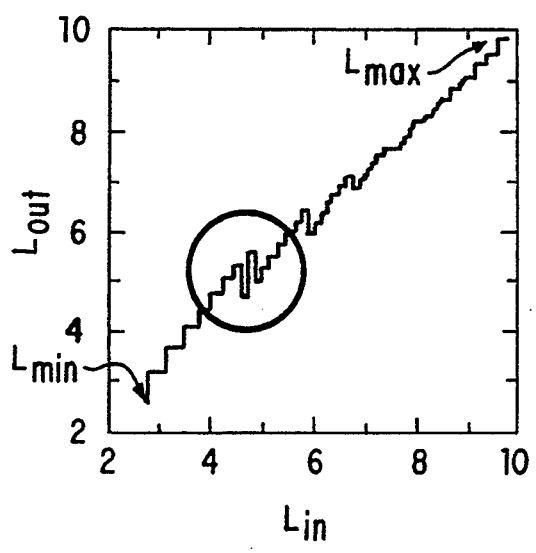
FIG. 13 is a graphical representation of a TRC having several Tone Reversal Errors.
Figure 14:
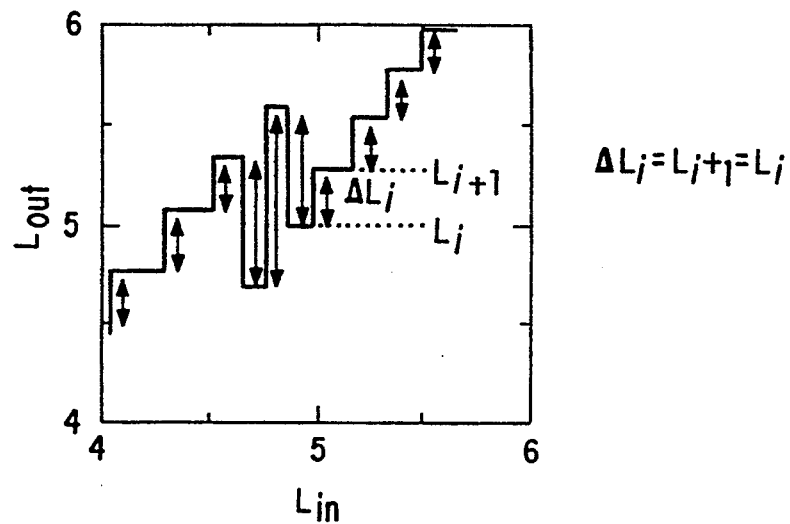
FIG. 14 is a blown-up view of a portion of the TRC shown in FIG. 13.

A quantitative measure of tone reversal error can be obtained from the cumulative vertical length of the TRC. The cumulative vertical length for all TRC's without reversal is $L_{max}-L_{min}$. Any reversal causes an increase in length, with large reversals causing more of an increase. This trend leads us to define a fractional TRC reversal error, $\epsilon$, given by $$\text{TRC Reversal Error} = \frac{\text{(Actual Vertical Length)} - \text{(Nominal Vertical Length)}}{\text{(Nominal Vertical Length)}}, \quad (5)$$

or, symbolically as $$\epsilon = \frac{\left(\sum_{i=1}^{N-1} \Delta L_i\right) - (L_{max} - L_{min})}{(L_{max} - L_{min})}, \quad (6)$$

where $\Delta L_i$ is the difference in Munsell value between the ith and the ith+1 gray steps, and N is the total number of gray steps. FIGS. 12, 13 and 14 show schematically how tone reversal relates to cumulative vertical length.

FIG. 12 shows a TRC with no reversal error. FIG. 13 shows a TRC with several reversal errors. FIG. 14 is an exploded view of the circled portion of FIG. 13 showing vertical displacement of TRC steps and their relationships as used in the formulas described above.

Figure 15:
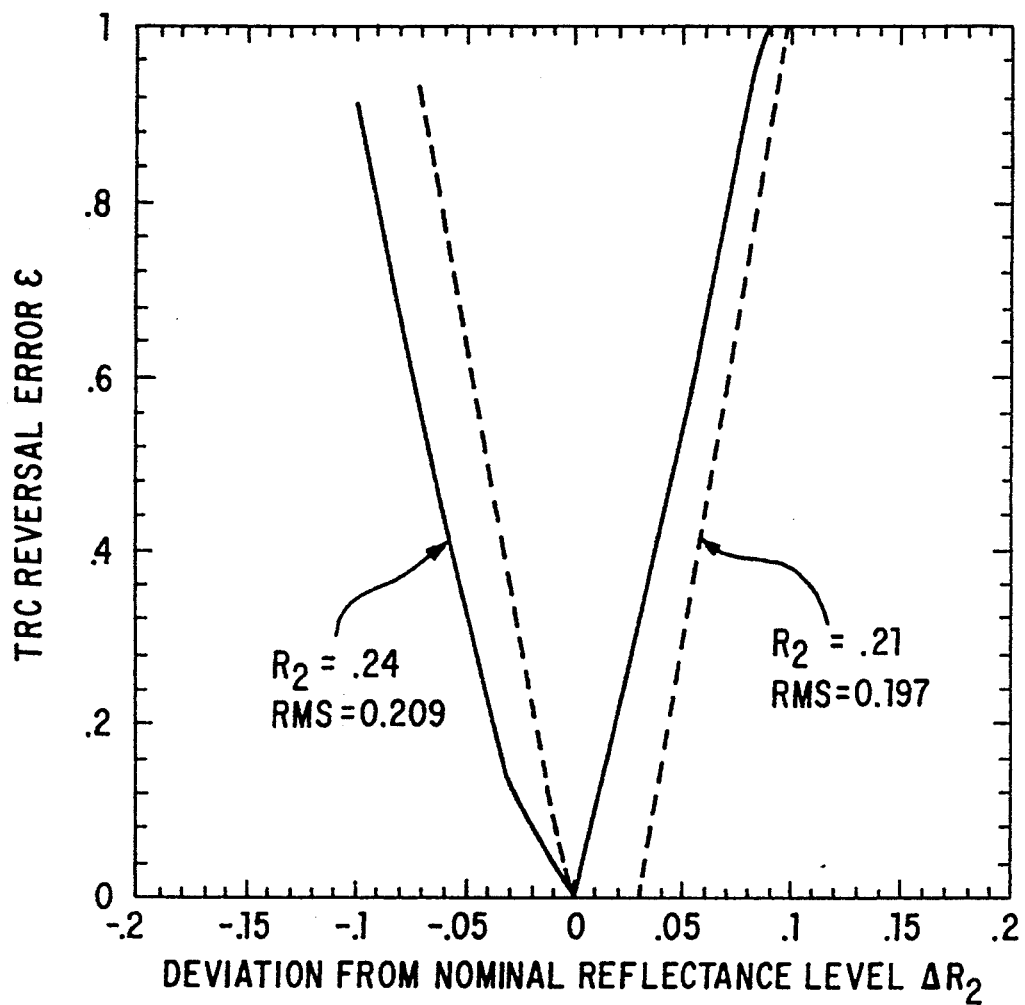
FIG. 15 is a graphical representation of Tone Reversal Error compared to the deviation from a nominal intermediate reflectance level for an eight pixel cell in the trinary case.

To determine the sensitivity, or tendency, toward tone reversal, an intermediate level with an acceptable RMS value can be evaluated for s as the printed reflectance varies from the nominal. FIG. 15 shows sensitivity curves calculated for two different choices of intermediate level in the trinary system. Each of these intermediate levels has an RMS step size of less than 0.3, which was chosen for the purposes of illustration. In FIG. 15, a given curve corresponds to the chosen nominal intermediate reflectance level. The x-axis, $\Delta R_2$, gives the deviation of the printed level from the nominal level. As this deviation increases, tone reversals occur, and some nominal reflectance levels have a greater potential for reversal than others.

This sensitivity analysis can be applied to selection of the intermediate level for a given printer. An example of this analysis can be to first weight $\epsilon$ by an estimated probability density function corresponding to the random variable $\Delta R_2$. The integral of the weighted curve for a given intermediate level is a measure of the sensitivity, $S(R_2)$. The $R_2$ level with the minimum sensitivity, S, and sufficiently small RMS step size is a practical level.

Consider a source of reflectance error in a xerographic printer, such as, for example, photoconductor voltage fluctuation. It is reasonable to assume that the probability density function associated with the voltage level across a photoconductor is given roughly by a Gaussian distribution. It is also a reasonable assumption that the deviation in reflectance $\Delta R_2$ will be approximately normally distributed about a mean, or nominal reflectance within the range of possible reflectances. Thus the probability density function, $p(\Delta R_2)$, associated with the deviation of printed reflectance level is:

$$p(\Delta R_2) = \frac{1}{\sigma\sqrt{2\pi}} \exp\left[\frac{-(\Delta R_2)^2}{2\sigma^2}\right], \quad (7)$$

$$0.05 < \Delta R_2 + R_2 < 1.0$$

where $R_2$ is the nominal reflectance of the pixel intermediate level and $\sigma$ is the standard deviation. The reflectance cannot deviate to below that of a thick patch of toner (R=0.05) or above that of paper (R=1.0), but the source of deviation, such as voltage fluctuation, can. Therefore, the probability density function at the saturation points is given by the integrals of the tails of the Gaussian distributions. Thus at the black level $(\Delta R_2 = 0.05 - R_2)$ $$p(\Delta R_2) = \frac{1}{\sigma\sqrt{2\pi}} \delta\left(\Delta R_2 + \right. \quad (8)$$

$$\left. R_2 - 0.05\right) \int_{-\infty}^{0.05 - R_2} \exp\left[\frac{-(\Delta R_2)^2}{2\sigma^2}\right] d(\Delta R_2) = \frac{1}{2} \delta\left(\Delta R_2 + \right.$$

-continued $$R_2 - 0.05) \left[ 1 + erf\left\{ \frac{0.05 - R_2}{\sigma \sqrt{2}} \right\} \right], \text{ for } \Delta R_2 + R_2 = 0.05$$

and at the white level ($\Delta R_2 = 1.0 - R_2$), $$p(\Delta R_2) = \frac{1}{\sigma \sqrt{2\pi}} \delta (\Delta R_2 + \quad (9)$$

$$R_2 - 1.0) \int_{1.0 - R_2}^{\infty} \exp\left[ \frac{-(\Delta R_2)^2}{2\sigma^2} \right] d(\Delta R_2) = \frac{1}{2} \delta (\Delta R_2 +$$

$$R_2 - 1.0) \left[ 1 + erf\left\{ \frac{1.0 - R_2}{\sigma \sqrt{2}} \right\} \right], \text{ for } \Delta R_2 + R_2 = 1.0$$

where $\delta$ is the Dirac delta function and erf is the error function (i.e., the integral of the Gaussian distribution). Probability density functions such as this are termed mixed, continuous and discrete and are often encountered in saturating processes.

Figure 16:
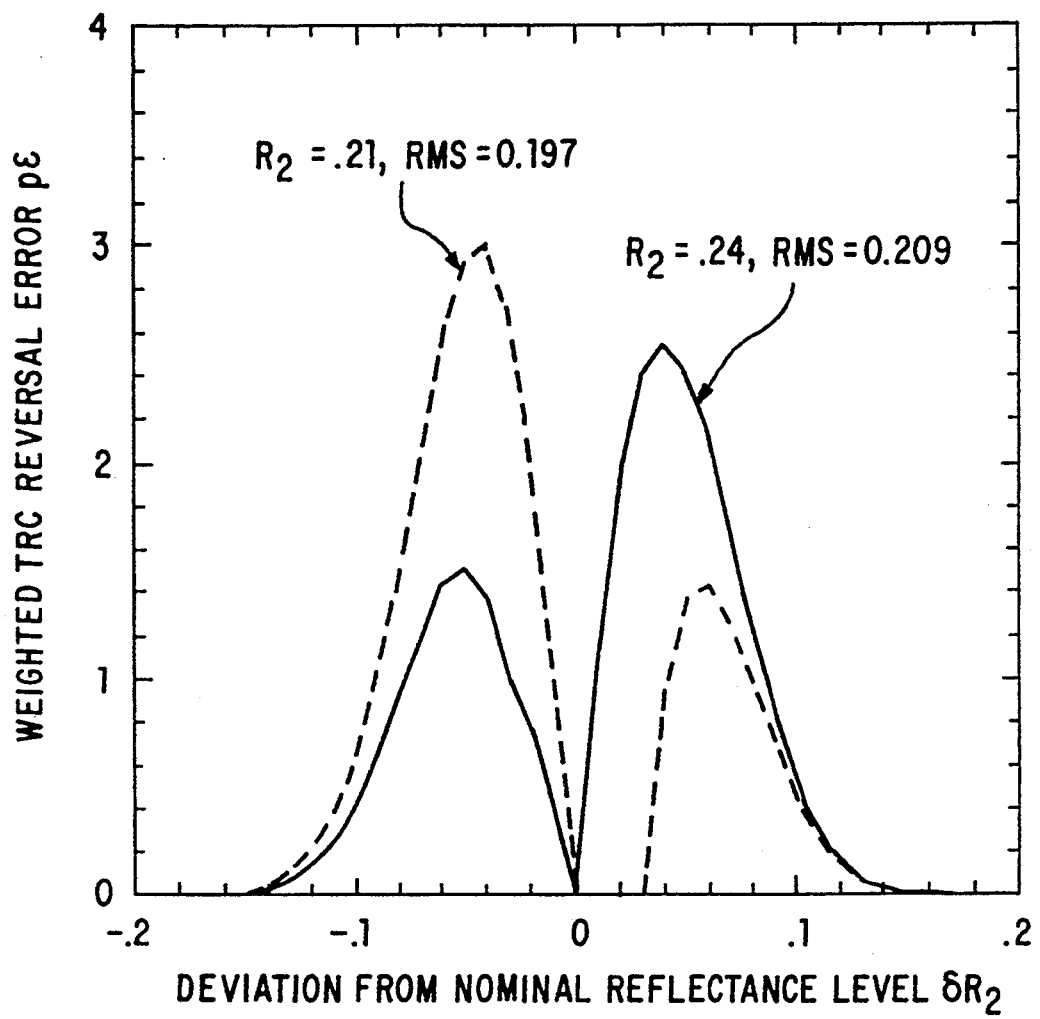
FIG. 16 is a graphical representation of sensitivity curves showing the weighted Tone Reversal Error compared to the deviation from a nominal intermediate reflectance level for an eight pixel cell in the trinary case.

FIG. 16 shows an example of the weighted sensitivity distribution for two values of $R_2$, each of which had an RMS step size less than 0.3. The weighted sensitivity distribution is the product of the reversal error function, $\epsilon(\Delta R_2)$, and probability density function, $p(\Delta R_2)$. By integrating this product over $\Delta R_2$, a measure of the tone reversal sensitivity for a given $R_2$ is obtained, $$S(R_2) = \int_{0.05 - R_2}^{1.0 - R_2} \epsilon(\Delta R_2) p(\Delta R_2) d\Delta R_2. \quad (10)$$

In this example, minimum sensitivity was found for $R_2 = 0.21$ which is therefore the selected intermediate reflectance. An intuitive rule of thumb for selecting an intermediate reflectance level is to choose a level with a sufficiently low RMS step size that is closest to black or white. An intermediate level cannot stray beyond saturation. Thus the closer a nominal level is to saturation, the less tone reversal is likely to occur.

When applying this analysis to a real xerographic printing system through the use of a xerographic model, the initial voltage on the photoconductor can be used as the random variable. The sensitivity would then be given by:

$$S(R_2) = \int_{\text{Voltage}} \epsilon(\Delta V_0) p(\Delta V_0) d\Delta V_0 \quad (11)$$

where $\epsilon(V_0)$ is the tone reversal error as a function of initial voltage and $p(V_0)$ is the probability density function associated with that voltage. Also note that the use of voltage ($V_0$) instead of printed reflectance, as the random variable allows the tone reversal error analysis in quaternary and higher order systems to be treated in a similar one dimensional manner.

The procedure described here for a specific example can be applied generally to any hybrid halftone scheme and should result in high quality tone reproduction with reduced sensitivity to noise. Due to the number of variables present in determining a preferred reflectance value, no one formula can be used and a computer search technique is typically employed. The reflectance values are determined on a case-by-case basis using a variety of techniques.

Figure 9:
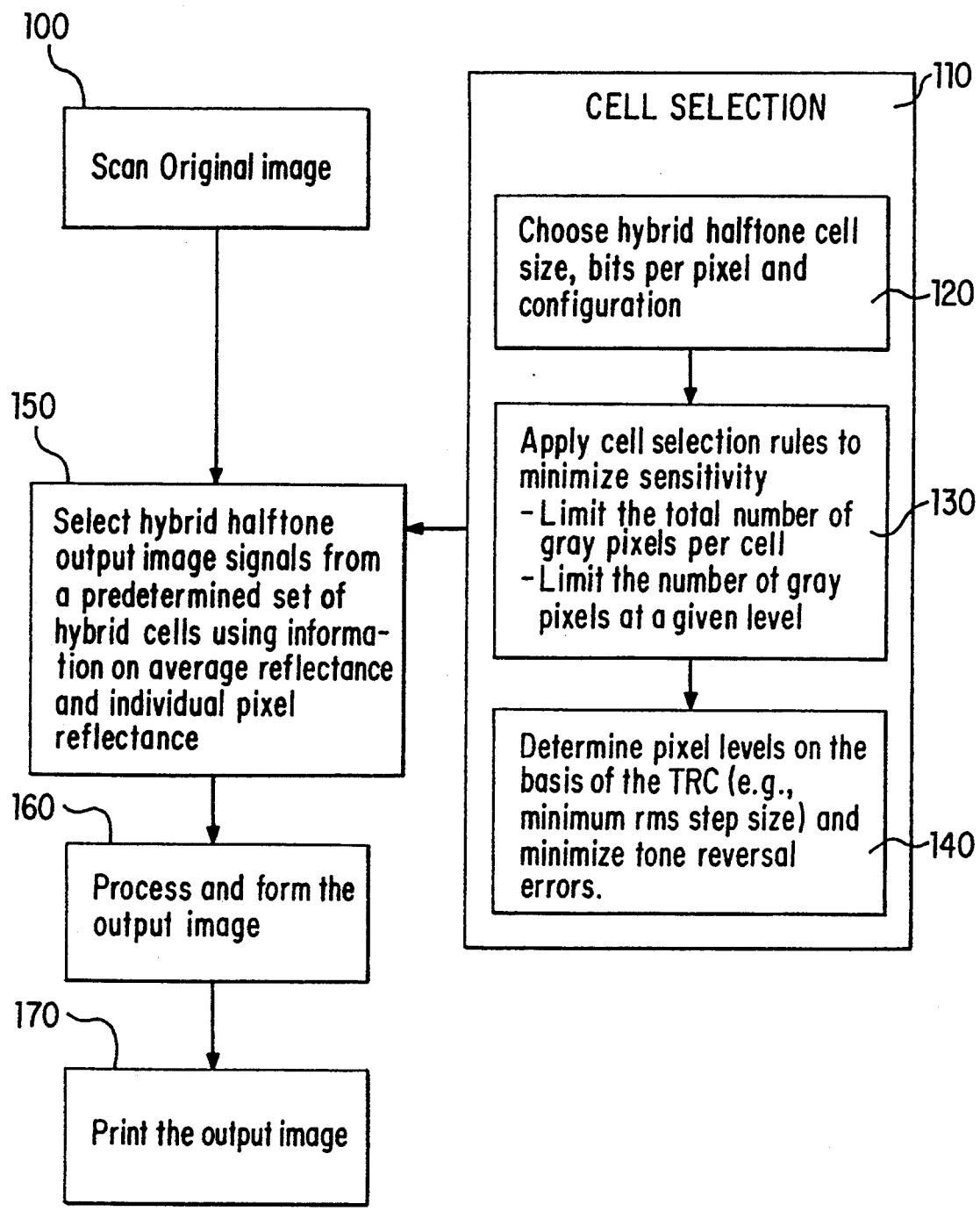
FIG. 9 is a flowchart illustrating the hybrid halftone printing method according to an aspect of the present invention.

The hybrid halftone printing process of the present invention is illustrated by the flowchart shown in FIG. 9. Initially, an image to be processed in accordance with the present invention is scanned by a digital printer to generate image signals representative of the density of successively viewed elements in step 100. Of course, a previously scanned image can be obtained from memory. The scanned image, which is made up of a plurality of pixels, is then converted to an output image signal made up of hybrid halftone cells in step 150. Halftone cells for particular average reflectances and meeting the cell selection criteria of the present invention are all stored in a look-up table that is used to determine the cell structure of the cells ultimately used to form the output image. The use of look-up tables for selection of cells having particular characteristics based on average reflectance values is taught in U.S. Pat. No. 4,868,587. The marking cells stored in the look-up table are constructed in step 110 which are derived prior to the imaging process. Cell selection step 110 comprises steps 120, 130 and 140. In step 120, the halftone cell structure is selected. The cell selection rules described above are then applied to the halftone cell structure to arrive at a set of marking cells 130. The pixels within each marking cell are assigned values ranging from white to black with intermediate gray levels in between. In order to reduce uniform gray areas, the total number of gray level pixels within any marking cell is limited to a predetermined maximum, such as, for example, one-half the total number of pixels in the marking cell (i.e., (mn)/2) 130. In addition, to reduce the total amount of gray, the number of pixels in any marking cell having a particular gray level is limited to a predetermined maximum, such as, for example, no more than three pixels having a particular gray level per marking cell 130. Then, based on a desired TRC, intermediate pixel levels are selected that reduce the sensitivity of the process to noise 140. The imaging process is completed using the newly halftoned image 150 in steps 160 and 170. Step 150 includes the elimination of the most sensitive cells from the marking set for the full case as described above.

The aforedescribed hybrid halftone printing technique using cell selection criteria and step selection yields superior tone retention using smaller halftone cell sizes and also allows a lower resolution (i.e., fewer spots per inch) to be used which, in turn, reduces the data storage and data transmission requirements and result in substantial reduction in cost.

It is understood that while trinary and quaternary levels have been shown and described herein, additional levels (i.e., five levels, six levels, etc.) may be contemplated.

While the invention has been described with reference to the method disclosed, it is not confined to the details set forth, but is intended to cover such modifications or changes as may come within the scope of the following claims.

What is claimed is:

1. A method of making a halftone image reproduction, comprising the steps of:
   applying marking cell selection rules to minimize sensitivity to noise by selecting a first maximum number and a second maximum number, said first maximum number representative of a maximum number of gray pixels in a single marking cell, said first maximum number being no greater than one-half a total number of pixels in the single marking cell, said second maximum number representative of a maximum number of gray pixels in the single marking cell having an identical intermediate gray level, said second maximum number being no greater than three;

storing an initial set of marking cells in a memory, each stored marking cell being a two-dimensional array of pixels conforming with the selected marking cell rules, each pixel having a level selected from the group consisting of a white level, a black level and at least one gray level, each marking cell stored in the memory having a total number of gray pixels no greater than the first maximum number and a number of gray pixels having the identical intermediate gray level no greater than the second maximum number;

scanning an image and in timed relation therewith generating image signals representative of the density of successively viewed elemental areas within the image;

based on said image signals, selecting a set of the marking cells from the initial set of marking cells stored in the memory;

outputting hybrid halftone output image signals from a set of predetermined hybrid halftone image signals corresponding to the selected set of marking cells; and forming a halftone image on an image receiving member using said output hybrid halftone output image signals.

2. The method of claim 1, wherein said gray pixels include first gray pixels having a first gray level and second gray pixels having a second gray level different from said first gray level.

3. The method of claim 1, wherein said selected set of marking cells and corresponding output image signals is selected from the initial set of marking cells, and wherein the gray levels of the intermediate gray pixels in said selected set are determined in accordance with gray level determination criteria after being selected from said initial set of marking cells.

4. The method of claim 3, wherein said gray level determination criteria includes selecting the gray levels so as to minimize a root-mean-squared step size of a tone reproduction curve produced by said marking cells.

5. The method of claim 3, wherein said gray level determination criteria includes selecting the gray levels so as to minimize a tendency of said selected set of marking cells to produce tone reversal errors.

6. The method of claim 1, wherein the marking cells in said selected set are further determined by limiting the total number of marking cells in said selected set to a number that produces a selected number of distinct reflectance values.

7. The method of claim 6, wherein the gray levels of the intermediate gray pixels in said selected set are determined in accordance with gray level determination criteria, said gray level determination criteria including selecting the gray levels so as to minimize a tendency of said selected set of marking cells to produce tone reversal errors.

8. A method of making a halftone image reproduction, comprising the steps of:

applying marking cell selection rules to minimize sensitivity to noise by selecting a maximum number representative of a maximum number of gray pixels in a single marking cell, said maximum number being no greater than one-half a total number of pixels in the single marking cell;

storing an initial set of marking cells in a memory, each stored marking cell being a two-dimensional array of pixels conforming with the selected marking cell rules, each pixel having a level selected from the group consisting of a white level, a black level and at least one gray level, each marking cell stored in the memory having a total number of gray pixels no greater than the maximum number;

scanning an image and in timed relation therewith generating image signals representative of the density and image structure of successively viewed elemental areas within the image;

based on said image signals, selecting a set of marking cells from the initial set of marking cells stored in the memory;

outputting hybrid halftone output image signals from a set of predetermined hybrid halftone image signals corresponding to the selected set of marking cells; and forming a halftone image on an image receiving member using said output hybrid halftone output image signals.

9. The method of claim 8, wherein said gray pixels include first gray pixels having a first gray level and second gray pixels having a second gray level different from said first gray level.

10. The method of claim 9, wherein said selected set of marking cells and corresponding output image signals is selected from the initial set of marking cells, and wherein the gray levels of the intermediate gray pixels in said selected set are determined in accordance with gray level determination criteria after being selected from said initial set of marking cells.

11. The method of claim 19, wherein said gray level determination criteria includes selecting the gray levels so as to minimize a root-mean-squared step size of a tone reproduction curve produced by said marking cells.

12. The method of claim 10, wherein said gray level determination criteria includes selecting the gray levels so as to minimize a tendency of said selected set of marking cells to produce tone reversal errors.

13. The method of claim 8, wherein the marking cells in said selected set are further determined by limiting the total number of marking cells in said selected set to a number that produces a selected number of distinct reflectance values.

14. The method of claim 13, wherein the gray levels of the intermediate gray pixels in said selected set are determined in accordance with gray level determination criteria, said gray level determination criteria including selecting the gray levels so as to minimize a tendency of said selected set of marking cells to produce tone reversal errors.

15. A method of making a halftone image reproduction, comprising the steps of:

applying marking cell selection rules to minimize sensitivity to noise by selecting a maximum number of gray pixel levels in a single marking cell, said maximum number of said pixel levels being no greater than three;

storing an initial set of marking cells in a memory, each stored marking cell being a two-dimensional array of pixels conforming with the selected marking cell rules, each pixel having a level selected from the group consisting of a white level, a black level and at least one gray level, each stored marking cell having a number of gray pixels with a number of identical intermediate gray levels no greater than the maximum number;

scanning an image and in timed relation therewith generating image signals representative of the density of successively viewed elemental areas within the image;

based on said image signals, selecting a set of marking cells from the initial set of marking cells stored in the memory;

outputting hybrid halftone output image signals from a set of predetermined hybrid halftone image signals corresponding to the selected set of marking cells; and forming a halftone image on an image receiving member using said output hybrid halftone output image signals.

* * * * *